United States Patent [19]

Aiba et al.

[11] Patent Number: 4,857,488

[45] Date of Patent: Aug. 15, 1989

[54] CASTING NOZZLE

[75] Inventors: Yoshiro Aiba; Kazumi Arakawa; Takashi Watanabe; Kazuhide Kawai, all of Kariya, Japan

[73] Assignee: Toshiba Ceramics Co., Ltd., Japan

[21] Appl. No.: 7,468

[22] Filed: Feb. 28, 1987

[30] Foreign Application Priority Data

Mar. 13, 1986 [JP] Japan .................................. 61-53777

[51] Int. Cl.$^4$ ............................................. C04B 35/10
[52] U.S. Cl. ..................................... 501/89; 264/63; 501/90
[58] Field of Search ....................... 264/63; 501/89, 90

[56] References Cited

U.S. PATENT DOCUMENTS

| | | | |
|---|---|---|---|
| 3,753,744 | 8/1973 | Komaru et al. | 501/89 |
| 4,039,342 | 8/1977 | Reerink et al. | 501/89 |
| 4,093,470 | 6/1978 | Cherry | 501/89 |

FOREIGN PATENT DOCUMENTS 56-165549 12/1981 Japan .
58-125660 7/1983 Japan .

Primary Examiner—James Derrington
Attorney, Agent, or Firm—Lorusso & Loud

[57] ABSTRACT

A method for making a casting nozzle, includes mixing a main casting nozzle material 70–95% by weight and electrofused aggregates 5–30% by weight, the electrofused aggregates consisting essentially of $ZrO_2$ 30–60% by weight, $Al_2O_3$ 20–50% by weight, $SiO_2$ 10–20% by weight and SiC 5–40% by weight together with a binder, thereby to make a mixture, forming the mixture in the shape of a casting nozzle thereby to make a formed body, and sintering the formed body.

8 Claims, No Drawings

CASTING NOZZLE

BACKGROUND OF THE INVENTION

This invention relates to a casting nozzle and a method for making same.

It has been proposed to use electrofused aggregates in a method for making a casting nozzle such as a continuous casting nozzle. For example, see Japanese Patent Laying-Open Nos. 56-165549 and 58-125660.

Conventional electrofused aggregates for use in production of a casting nozzle are zirconia-mullite electrofused aggregates (ZRM) or zirconia-alumina electrofused aggregates which are suitable for the purpose of improving spalling resistance. Those conventional aggregates are not so effective as to improve other physical characteristics of a casting nozzle.

SUMMARY OF THE INVENTION

The object of this invention is to provide a casting nozzle and a method for making same in which spalling resistance and other physical characteristics are improved.

According to this invention, a primary casting nozzle material 70–95% by weight is blended with electrofused aggregates 5–30% by weight which consists essentially of $ZrO_2$ 30–60% by weight, $Al_2O_3$ 20–50% by weight, $SiO_2$ 10–20% by weight and SiC 5–40% by weight. A binder such as phenol resin is mixed therewith thereby to make a mixture. The mixture is formed in the shape of a casting nozzle and then sintered.

Preferably, the primary casting nozzle material is alumina-carbon. Also, fused silica, metallic silicon and other ingredients can be added.

The electrofused aggregates are mainly zirconia-mullite with silicon carbide added, whereby at least spalling resistance and thermal conductivity of a casting nozzle can be remarkably improved.

From the viewpoint of the mineral composition, the electrofused aggregates are composed of baddleleyite, mullite and silicon carbide, including in part corundum.

If zirconia is less than 30% by weight, corrosion resistance is not sufficient. If zirconia is more than 50% by weight, spalling ressistance is decreased. The ratio of alumina to silica is so determined as to produce properly mullite. Silicon carbide ranges between 5 and 40% by weight so as to provide the desired corrosion resistance.

PREFERRED EMBODIMENTS

The special electrofused aggregates which are used as starting material are formed by blending, $ZrO_2$ 35% by weight, $Al_2O_3$ 45% by weight, $SiO_2$ 15% by weight and SiC 5% by weight and then electrofusing so as to produce coarse electrofused aggregates.

In a first example, 10 parts by weight of the coarse electrofused aggregates are mixed with coarse sinitered alumina powder 35 parts by weight, fine carbon powder 35 parts by weight, fine fused silica powder 15 parts by weight, fine metallic silicon powder 5 parts by weight and phenol resin 10 parts by weight thereby to produce a mixture. This mixture is formed and then sintered so as to make a continuous casting nozzle.

In a second example, the coarse electrofused aggregates 20 parts by weight are mixed with coarse sintered alumina powder 25 parts by weight, fine carbon powder 35 parts by weight, fine fused silica powder 15 parts by weight, fine metallic silicon powder 5 parts by weight and phenol resin 10 parts by weight so as to produce a mixture. This mixture is formed and then sintered thereby to make a continuous casting nozzle.

In a comparative example, for instance, as disclosed in Japanese Patent Laying-Open No. 56-165549, conventional electrofused aggregates are composed of $ZrO_2$ 40% by weight, $Al_2O_3$ 45% by weight and $SiO_2$ 15% by weight. The conventional electrofused aggregates 20 parts by weight are mixed with coarse sintered alumina powder 25 parts by weight, fine carbon powder 35 parts by weight, fine fused silica powder 15 parts by weight, fine metallic silicon powder 5 parts by weight and phenol resin 10 parts by weight thereby to produce a mixture. This mixture is formed and then sintered so as to make a continuous casting nozzle.

In this specification, the "coarse powder" or "aggregates" means A powder of 8-14 mesh while "fine powder" means A powder of 200 mesh or less.

Spalling tests by an AE (Air entraining) method were made with respect to the first and second examples and the comparative example. After each test piece was rapidly heated from 1400° C. for one minute, each AE count mumber was noted. In the first example, the AE count number is 2850 so that spalling resistance is excellent. In the second example, the AE count number is 1680 so that spalling resistance is excellent. In the comparative example, the AE count number is 3550 so that spalling resistance is poor.

According to this invention, the thermal expansion coefficient of the special electrofused aggregates is about 0.55% at 1,000° C., which is low like zirconia-mullite electrofused aggregates (ZRM). Thermal conductivity of the special electrofused aggregates is 0.60–0.78 Kcal/mh°C., which is higher than that of ZRM. Therefore, peeling or cracking of a casting nozzle can be effectively avoided so that its service life is prolonged.

Incidentally, thermal conductivity of ZRM is 0.55 Kcal/mh°C. at 1.000° C.

If silicon carbide aggregates are mixed with the electrofused aggregates, then the degree of sintering is poor so that excellent strength cannot be obtained.

We claim:

1. A method for making a casting nozzle comprising the steps of:
   providing a first mixture consisting essentially of:
     about 30–60 wt.% $ZrO_2$
     about 20–50 wt.% $Al_2O_3$
     about 10–20 wt.% $SiO_2$
     about 5–40 wt.% SiC
   electrofusing said first mixture to form electrofused aggregates;
   mixing (1) about 70–95 wt.% of a primary casting nozzle material comprising alumina and carbon with (2) about 5–30 wt.% of said electrofused aggregates together with a binder to form a second mixture;
   shaping said second mixture into the shape of a casting nozzle to thereby make a formed body; and
   sintering the formed body to produce the casting nozzle.

2. The method of claim 1, wherein said casting nozzle material comprises a mixture of coarse sintered alumina powder, fine carbon powder, fine fused silica, and fine metallic silicon.

3. The method of claim 1, wherein the electrofused aggregates have an average diameter of from about 8 to 14 mesh.

4. The method of claim 2, wherein the sintered alumina powder has an average diameter of from about 8 to 14 mesh, and wherein the carbon powder, the fused silica and the metallic silicon each have an average diameter of 200 mesh or less.

5. A casting nozzle made by the method of claim 1.
6. A casting nozzle made by the method of claim 2.
7. A casting nozzle made by the method of claim 3.
8. A casting nozzle made by the medhod of claim 4.

* * * * *